UNITED STATES PATENT OFFICE.

WILHELM BAUER AND ALFRED HERRE, OF OPLADEN, NEAR COLOGNE, GERMANY, ASSIGNORS TO SYNTHETIC PATENTS CO., INC., OF NEW YORK, N. Y., A CORPORATION OF NEW YORK.

RED VAT DYE.

1,147,778.     Specification of Letters Patent.     Patented July 27, 1915.

No Drawing.     Application filed October 6, 1914. Serial No. 865,288.

*To all whom it may concern:*

Be it known that we, WILHELM BAUER and ALFRED HERRE, doctors of philosophy, chemists, citizens of the German Empire, residing at Opladen, near Cologne, Germany, have invented new and useful Improvements in Red Vat Dye, of which the following is a specification.

The present invention relates to the manufacture and production of new and valuable indigoid vat dyestuffs. They can be produced by condensing halogenated derivatives of isatin compounds e. g. isatins, naphthisatins, in which isatin compounds the oxygen of the alpha-keto group is replaced by an easily movable or replaceable substituent, e. g. anilido group, with a 3-aryl-1-indanon, and more particularly with 3-phenyl-1-indanon having the formula:

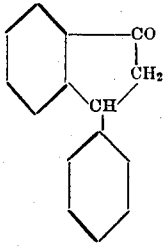

its substitution products or homologues, such as the 3-tolyl-1-indanon.

As alpha derivatives above mentioned can be used e. g. the 5.7.dichloro-isatin-alpha-anilid which yields a pure red while alpha-arylamins of the halogenated 2.3-naphthisatins yield very pure violets. The new products are after being dried and pulverized reddish powders soluble in concentrated sulfuric acid generally with a bluish coloration; dyeing cotton from an alkaline hydrosulfite vat generally from red to violet fast shades.

In order to illustrate the new process more fully the following example is given, the parts being by weight:—291 parts of 5.7-dichloro-isatin-alpha-anilid and 220 parts of 3-phenyl-1-indanon are heated together with 1000 parts of acetic acid anhydrid during 12 hours on the water bath in a vessel provided with a stirrer. The dye is filtered off, washed with ether and dried. It has most probably the formula:

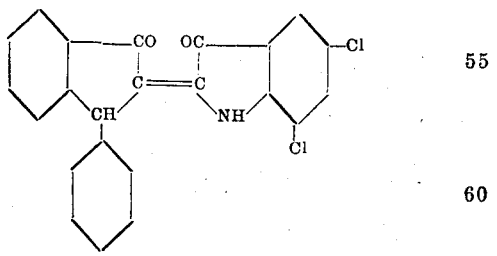

brownish-red crystals soluble in concentrated sulfuric acid with a pure blue coloration. With hydrosulfite and caustic soda lye a yellow vat is obtained dyeing cotton pure rhodamin-red fast shades.

We claim:—

1. The herein described new indigoid vat dyestuffs being derived from an alpha derivative of a halogen substituted isatin compound and a 3-aryl-1-indanon, which are after being dried and pulverized reddish powders soluble in concentrated sulfuric acid generally with a bluish coloration; and dyeing cotton from an alkaline hydrosulfite vat generally from red to violet fast shades, substantially as described.

2. The new indigoid vat dyestuff having most probably the formula:

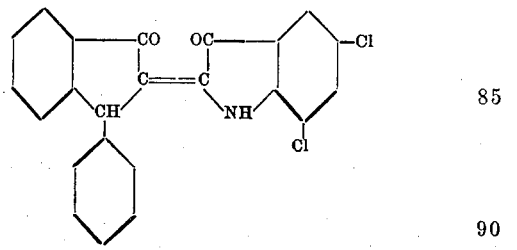

which is after being dried and pulverized a brownish-red crystalline compound soluble in concentrated sulfuric acid with a pure blue coloration; yielding with hydrosulfite and caustic soda lye a yellow vat dyeing cotton pure rhodamin-red fast shades, substantially as described.

In testimony whereof we have hereunto set our hands in the presence of two subscribing witnesses.

WILHELM BAUER.
ALFRED HERRE.

Witnesses:
J. D. ZIESECKEY,
LEO SCHOENTHAL.